(12) United States Patent
Huang

(10) Patent No.: US 9,794,783 B2
(45) Date of Patent: Oct. 17, 2017

(54) MACHINE-TO-MACHINE VISUAL CODE GENERATION AND RECOGNITION METHOD AND SYSTEM FOR DEVICE COMMUNICATIONS

(71) Applicant: Jeffrey Huang, San Jose, CA (US)

(72) Inventor: Jeffrey Huang, San Jose, CA (US)

( * ) Notice: Subject to any disclaimer, the term of this patent is extended or adjusted under 35 U.S.C. 154(b) by 53 days.

(21) Appl. No.: 14/599,448

(22) Filed: Jan. 16, 2015

(65) Prior Publication Data
US 2016/0212613 A1 Jul. 21, 2016

(51) Int. Cl.
*G06K 19/00* (2006.01)
*H04W 12/06* (2009.01)
*H04W 8/20* (2009.01)
*H04W 4/00* (2009.01)
*H04W 84/04* (2009.01)

(52) U.S. Cl.
CPC .......... *H04W 12/06* (2013.01); *H04W 4/005* (2013.01); *H04W 8/20* (2013.01); *H04W 4/001* (2013.01); *H04W 84/04* (2013.01)

(58) Field of Classification Search
USPC .................. 235/375, 435, 439, 454, 462
See application file for complete search history.

(56) References Cited

U.S. PATENT DOCUMENTS

| | | | |
|---|---|---|---|
| 2006/0242272 A1* | 10/2006 | Furukawa ........... | H04L 41/0869 709/220 |
| 2011/0244955 A1* | 10/2011 | Dinka et al. ................... | 463/31 |
| 2014/0084067 A1* | 3/2014 | Vanderhulst ............. | 235/462.01 |
| 2015/0127840 A1* | 5/2015 | Snodgrass ......... | G06F 17/30861 709/228 |

* cited by examiner

*Primary Examiner* — Matthew Mikels
(74) *Attorney, Agent, or Firm* — Invent Capture, LLC.; Samuel S. Cho

(57) ABSTRACT

Various embodiments of a machine-to-machine visual code generation and recognition method and a corresponding system are disclosed. In one embodiment, a first machine gathers real-time hardware setting information of the first machine, and subsequently generates a first QR code that embeds hardware setting information of the first machine. The first QR code is displayed to a display panel connected to the first machine, and a second machine with a camera captures the first QR code, and deciphers the first QR code to determine communication compatibility between the first machine and the second machine. Then, the second machine formulates a response that incorporates its own real-time hardware setting information, and generates a second QR code that embeds the second machine's response to the first machine. Subsequently, the first machine scans the second QR code from the second machine's display panel, and registers the second machine's hardware setting information.

7 Claims, 7 Drawing Sheets

MACHINE-TO-MACHINE VISUAL CODE GENERATION AND RECOGNITION METHOD AND SYSTEM FOR DEVICE COMMUNICATIONS

BACKGROUND OF THE INVENTION

The present invention generally relates to electronic device communications. More specifically, the invention relates to machine-to-machine visual code generation and recognition for device communications.

Visual codes, such as bar codes and QR (Quick Response) codes, have been widely utilized to scan information embedded in the visual codes with a dedicated scanner unit or with a "smart" device, such as a tablet computer or a mobile phone that can be configured to execute a visual code mobile application.

A conventional visual code is typically printed on paper, which is either part of a printed material or is attached to an item. For example, many products sold in retail stores in recent decades have visual codes (e.g. bar codes or QR codes) printed on or attached to those products. These visual codes incorporate symbolized representation of product-related information, and are configured to be scanned by a bar code reader or a QR code reader at a store counter to expedite entry of the product-related information into a cash register and a transaction processing system.

Likewise, numerous advertisements in printed magazines, publications, or storefronts in recent years have embedded QR codes that contain Internet hyperlinks to promotional websites and product-related information, which can be scanned with a consumer's mobile device that includes a camera lens and a QR code scanning mobile application. The utilization of QR codes to entice consumers to research into advertised products and services with a simple QR code scanning action from the consumers' mobile devices is a popular marketing strategy that may improve the simplicity of access to advertising materials for consumers, instead of urging the consumers to enter hyperlinks and other data manually into the consumers' mobile devices for product research.

However, visual codes utilized in the market today do not include any novel applications in machine-to-machine communications. Even though conventional wireless network and communication protocols for home and office use, such as wireless local area networks (WiLAN) and Bluetooth, provide users with methods to configure and connect a plurality of electronic devices wirelessly, the users are typically required to enter, fine-tune, select, and modify a variety of hardware settings information manually on each of the electronic devices. For technically non-savvy users, configuring and establishing such device communications among a multiple number of electronic devices for home or office use can be a frustrating and time-consuming experience, which may even require hours of troubleshooting in some cases.

Therefore, it may be beneficial to provide a novel machine-to-machine (M2M) visual code generation and recognition method to simplify and/or automate hardware communication settings and configurations between two electronic devices.

Furthermore, it may also be beneficial to provide an electronic system that executes and enables the novel machine-to-machine (M2M) visual code generation and recognition method to simplify and/or automate hardware communication settings and configurations.

In addition, it may also be beneficial to provide one or more mobile applications that are executed on a "smart" webcam connected to a display panel and on a consumer's mobile device (e.g. a tablet computer, a smart phone, etc.) to embody the novel machine-to-machine (M2M) visual code generation and recognition method.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for machine-to-machine visual code generation and recognition for configuring hardware compatibility settings is disclosed. This method comprises the steps of: generating a first visual code from a first machine, wherein the first visual code contains the first machine's hardware parameters and configurations for a wireless protocol communication compatibility with a second machine; displaying the first visual code on a first display panel connected to the first machine; activating a visual code scanner application from the second machine, and scanning the first visual code from the first display panel connected to the first machine by activating a camera attached to the second machine; decoding the first visual code with the visual code scanner application from the second machine to extract the first machine's hardware parameters and configurations for the wireless protocol communication compatibility with the second machine; determining mutually-compatible hardware and network settings by comparing the first machine's hardware parameters and configurations and the second machine's hardware parameters and configurations; generating the second machine's response to the first machine, wherein the second machine's response includes the second machine's compatible hardware parameters and configurations with the first machine; generating a second visual code from the second machine, wherein the second visual code contains the second machine's response to the first machine; displaying the second visual code on a second display panel connected to the second machine to enable the first machine to scan the second visual code; and activating a compatible wireless communication between the first machine and the second machine, based on the mutually-compatible hardware and network settings discovered through an exchange of the first visual code from the first machine and the second visual code from the second machine.

DETAILED DESCRIPTION

Figure 1:
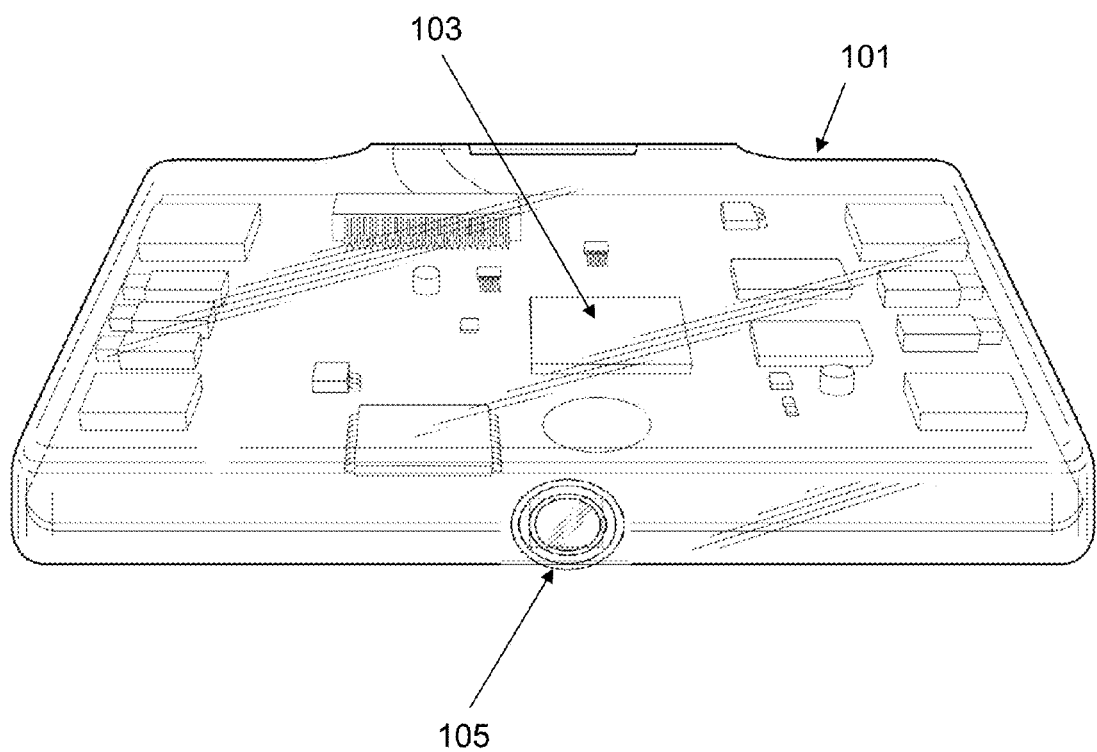
FIG. 1 shows a frontal transparent perspective diagram of a smart webcam device with a camera lens and an internal circuit board, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble one or more machine-to-machine (M2M) visual code generation and recognition methods and systems to simplify and/or automate hardware communication settings and configurations between two electronic devices. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "webcam" is defined as an electronic device with a camera lens that can capture pictures, videos, and/or other multimedia information through the camera lens. Typically, a webcam is connected to a computing unit, such as a PC, a laptop computer, a cellular phone, or another electronic device, that can process and store the captured pictures, videos, and/or other multimedia information in standardized multimedia formats. Furthermore, the webcam is typically utilized to transmit either raw streams or processed and formatted streams of captured pictures, videos, and/or other multimedia information to a remotely-connected computer server or another networked electronic device via a data network, such as the Internet.

In addition, for the purpose of describing the invention, a term "visual code" is defined as a symbolic and geometric representation of information that can be deciphered from the symbolic representation. Typically, a visual code is compactly represented by a series of bars or a graphical symbol. Examples of visual codes include, but are not limited to, bar codes and Quick Response (QR) codes.

Moreover, for the purpose of describing the invention, a term "machine-to-machine," or "M2M," refers to an interaction between one machine with another machine, wherein the interaction between the two machines is primarily initiated, executed, and completed autonomously with minimal human supervision or intervention by utilizing artificial intelligence (AI) executed in the two machines.

In addition, for the purpose of describing the invention, a term "cloud," "cloud network," or "cloud computing" is defined as a data network environment in which data from an electronic system operatively connected to the data network environment is typically stored in a network-attached storage, instead of being solely stored in a local storage of the electronic system as long as the data network is available for data communication. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, an "electronic system," a "computing unit," and/or a "main computing unit" are defined as electronic-circuit hardware devices such as a computer system, a computer server, a handheld device (e.g. a cellular phone, a camera, a camcorder, and etc.), an integrated webcam system, or another electronic-circuit hardware device.

Furthermore, for the purpose of describing the invention, a term "smart webcam device" is defined as a novel webcam device that integrates camera lens-based capturing of multimedia information (i.e. pictures, videos, and etc.), internal processing of multimedia information within the novel webcam device, and cloud network communication capability to transmit the internally-processed multimedia information to another electronic device via a cloud network. In a preferred embodiment of the invention, a smart webcam device is also configured to function as an Internet modem and a general-purpose cloud network-connected computing device for web browsing, if a separate display screen or a television screen is connected to the smart webcam device.

In addition, for the purpose of describing the invention, a term "webcam-specific circuitry" is defined as one or more groups of electronic circuits that are located inside a discrete casing that also houses a camera lens as part of a webcam unit. Examples of webcam-specific circuitry include, but are not limited to, a camera processing unit, a camera lens, and/or a data input/output (I/O) port inside the discrete casing that houses the camera lens for the webcam unit.

Moreover, for the purpose of describing the invention, a term "network communication-capable computing circuitry" is defined as one or more groups of electronic circuits that are configured to transmit a plurality of multimedia data packets to another electronic device via a data communication network, such as a local area network (LAN), a cloud network, and/or the Internet. For example, in a preferred embodiment of the invention, the network communication-capable computing circuitry can be housed in a casing of a smart webcam device. Furthermore, in one embodiment of the invention, the network communication-capable computing circuitry is also capable of performing picture, video, and other multimedia information-processing functions to transform raw multimedia data captured from a smart webcam device's camera lens into processed multimedia data in standardized formats, such as Joint Photography Experts Group (JPEG) and Moving Pictures Experts Group (MPEG). In this embodiment of the invention, the processed multimedia data can then be transmitted to another electronic device via a data communication network. In an alternate embodiment of the invention, the processing of multimedia data may be performed at least partially or completely outside of the network communication-capable computing circuitry.

In general, one or more embodiments of the invention relate to a simplified hardware configuration procedure between one machine with another machine based on visual code generation that embeds hardware settings information, and visual code scanning that recognizes the embedded hardware settings information in a largely autonomous machine-to-machine communication.

Furthermore, one or more embodiments of the invention also relate to providing a machine-to-machine communication method that does not require an existing wireless protocol-based connection (e.g. WiLAN, Bluetooth, NFC, and etc.) between a first machine and a second machine.

In addition, one or more embodiments of the invention also relate to providing a convenient hardware installation method between electronic devices that requires minimal or no manual entry of information into either of the electronic devices.

Furthermore, one or more embodiments of the invention also relate to providing one or more mobile applications executed in a first machine, wherein the one or more mobile applications are configured to gather hardware setting information of the first machine and generate a visual code that embeds the hardware setting information for visual code scanning by a second machine.

Moreover, one or more embodiments of the invention also relate to providing one or more mobile applications executed in a second machine, wherein the one or more mobile applications are configured to scan and decipher dynamically-generated visual codes displayed from a first machine with a camera attached to the second machine.

One objective of an embodiment of the present invention is to provide a novel machine-to-machine (M2M) visual code generation and recognition method to simplify and/or automate hardware communication settings and configurations between two electronic devices.

Another objective of an embodiment of the present invention is to provide an electronic system that executes and enables the novel machine-to-machine (M2M) visual code generation and recognition method to simplify and/or automate hardware communication settings and configurations.

Yet another objective of an embodiment of the present invention is to provide one or more mobile applications that are executed on a "smart" webcam connected to a display panel and on a consumer's mobile device (e.g. a tablet computer, a smart phone, etc.) to embody the novel machine-to-machine (M2M) visual code generation and recognition method.

FIG. 1 shows a frontal transparent perspective diagram (100) of a smart webcam device (101) with a camera lens (105) and an internal circuit board (103), in accordance with an embodiment of the invention. In a preferred embodiment of the invention, the smart webcam device (101) is a "first machine" that executes a mobile application in its CPU and a memory unit to gather hardware setting information of the first machine, and subsequently generate a visual code that embeds the hardware setting information for visual code scanning by a "second machine" In another embodiment of the invention, the first machine may be another electronic device, such as a smart television, a smart phone, a tablet computer, a notebook computer, or another electronic device that has an embedded webcam or a camera lens, and can execute mobile application programs for visual code generation and recognition with a second machine.

In context of the preferred embodiment of the invention, as shown in FIG. 1, the first machine is the smart webcam device (101), which includes its own CPU and a memory unit in the internal circuit board (103) within the casing of the webcam to encode and process multimedia information internally after the camera lens (105) captures a live footage of images. The smart webcam device (101) is also configured to execute mobile application programs that are loaded into its CPU and a memory unit through a USB port or another data communication port. Furthermore, in one embodiment of the invention, the smart webcam device (101) also incorporates a wireless local area network (LAN) modem, a Bluetooth transceiver, and/or a cellular transceiver in its webcam casing to connect to a local data network or to a nearby electronic device for data communications. Moreover, the smart webcam device (101) may also provide an Internet web browsing capability, if a separate display screen or a television screen is connected to the smart webcam device (101).

Continuing with FIG. 1, in the preferred embodiment of the invention, the smart webcam device (101) executes a QR code generation application program in its CPU and a memory unit, wherein the QR code generation application program gathers dynamically-changing and real-time hardware setting information of the smart webcam device (101), and subsequently generates a first QR code that embeds the hardware setting information of the smart webcam device (101). Once the first QR code is generated, it can be displayed to a separate display screen or a television screen, which is operatively connected to the smart webcam device (101), as shown in FIGS. 3~6.

Figure 3:
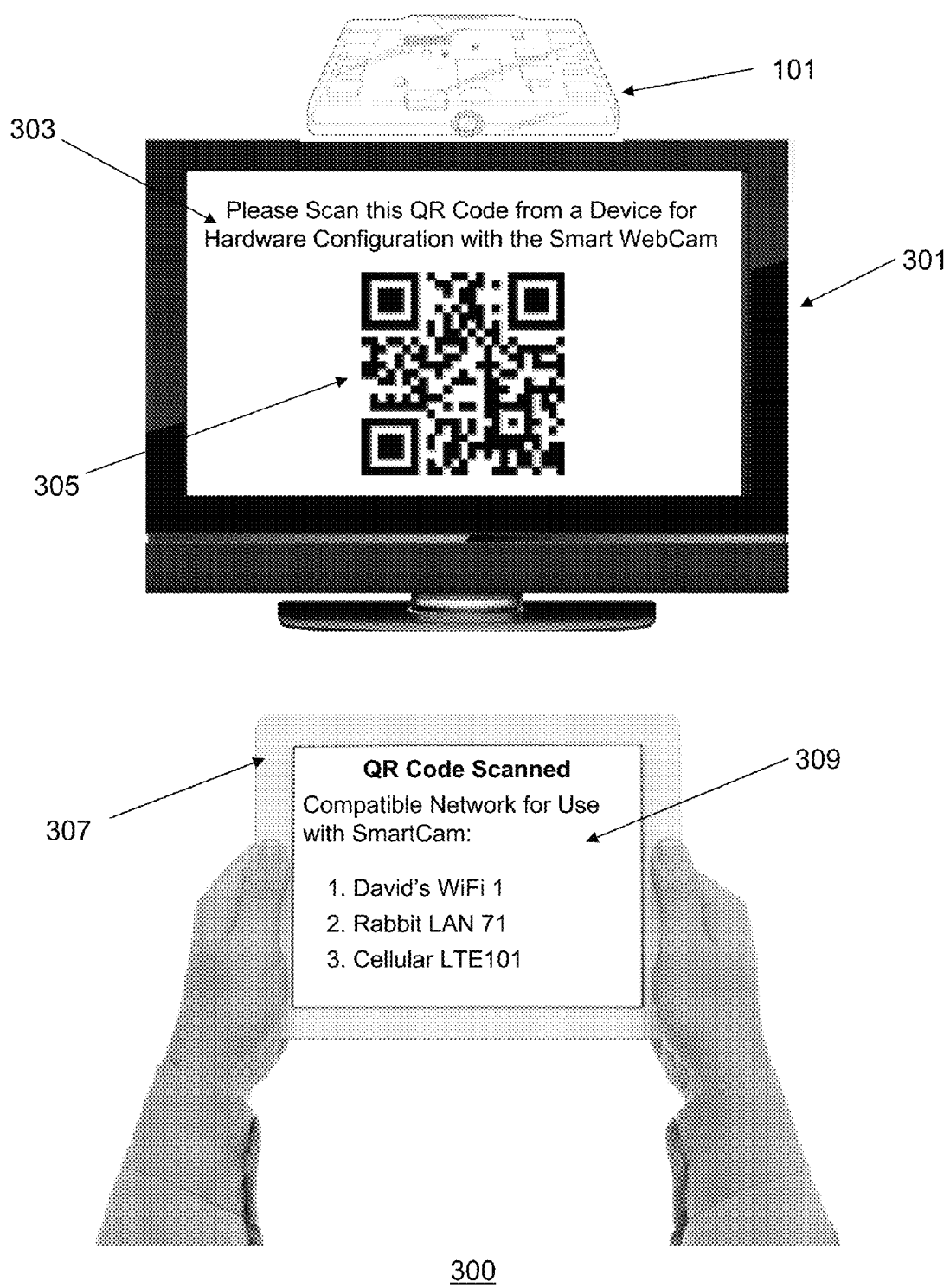
FIG. 3 shows a first machine-to-machine (M2M) interaction diagram between a first machine (i.e. the smart webcam device) and a second machine (i.e. a tablet computer), in accordance with an embodiment of the invention.

Furthermore, the smart webcam device (101) also executes a QR code recognition application program in its CPU and a memory unit, wherein the QR code recognition application program is configured to utilize the camera lens (105) of the smart webcam device (101) to capture and decipher a second QR code generated and displayed by a second machine (e.g. a tablet computer (307) in FIG. 3). In one embodiment of the invention, the second QR code embeds the second machine's hardware settings information and any necessary response by the second machine to the smart webcam device's (101) (i.e. the first machine's) hardware settings information, which was previously communicated to the second machine by displaying the first QR code. Furthermore, the QR code recognition application program may also be linked to hardware setting commands for the smart webcam device (101), so that a compatible and/or optimal hardware configuration can be achieved for a wireless communication setup (e.g. WiLAN, Bluetooth, NFC, cellular communication settings) between the first machine (e.g. the smart webcam device (101) and the second machine (e.g. the tablet computer (307) in FIG. 3).

Figure 2:
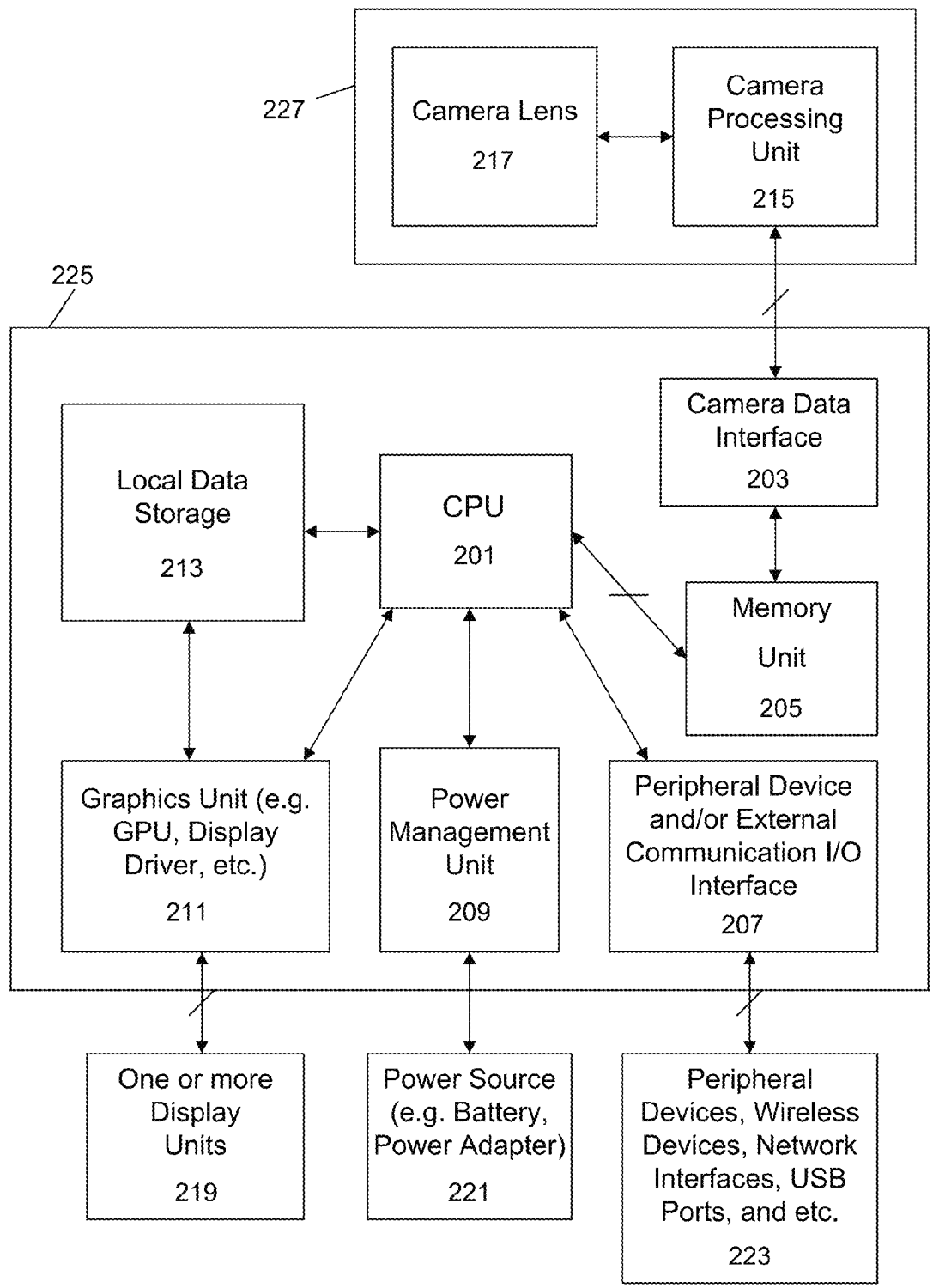
FIG. 2 shows a block diagram of logical units contained in a smart webcam device, in accordance with an embodiment of the invention.

FIG. 2 shows a block diagram (200) of logical units contained in a smart webcam device (e.g. 101 in FIG. 1), in accordance with an embodiment of the invention. In a preferred embodiment of the invention, the smart webcam device is capable of capturing raw multimedia data via a camera lens, processing and transforming the raw multimedia data into a standardized multimedia data set, and transmitting the standardized data set to a cloud network using a wireless transceiver or a wired network modem embedded in the smart webcam device. As shown in FIG. 2, in one embodiment of the invention, a network communication-capable computing circuitry (225) comprises a CPU (201), a camera data interface (203), a memory unit (205), a peripheral device and/or external communication input/output interface (207), a power management unit (209), a graphics unit (211), and a local data storage (213). The network communication-capable computing circuitry (225) is capable of transmitting multimedia data received from the camera data interface (203) to another electronic device via a data network, which may be a wireless data network, a wired data network, or a combination of the two networks.

Furthermore, the network communication-capable computing circuitry (225) also performs more tasks than the data transmission function alone. For example, the network communication-capable computing circuitry (225) can first receive raw multimedia data captured from a camera lens (217) and a camera processing unit (215) in a webcam-specific circuitry (227), and then decodes the raw multimedia data via the camera data interface (203) and the CPU (201) to extract a recognizable visual code, such as a QR code generated from a second machine and displayed by the second machine. Then, the network communication-capable computing circuitry (225) can execute a QR code recognition application program in its CPU (201) and the memory unit (205) to further decipher the recognizable visual code and extract hardware configuration information of the second machine, which is embedded in the recognizable visual code.

Examples of the hardware configuration information contained in the QR code include, but are not limited to, specific operable frequencies of wireless communication protocols for the second machine (e.g. 307 in FIG. 3), a compatible list of wireless communication protocols and channel information of the second machine, a desired encryption or decryption protocol information, a second machine's response to the first machine's hardware settings inquiries that may have been contained in a previously-displayed QR code generated by the first machine, and other network and/or security compatibility and availability information.

Furthermore, in one embodiment of the invention, the network communication-capable computing circuitry (225) is also capable of gathering hardware parameter and settings information for the smart webcam device, which can then be encoded into a visual code (e.g. a QR code) by utilizing a QR code generation application program executed on the CPU (201) and the memory unit (205). The QR code generation application program gathers dynamically-changing and real-time hardware setting information of the smart webcam device (i.e. the first machine), and subsequently generates a first QR code that embeds the hardware setting information of the smart webcam device. Once the first QR code is generated, it can be displayed to a separate display screen or a television screen, which is operatively connected to the smart webcam device, as shown in FIGS. 3~6.

Continuing with FIG. 2, in one embodiment of the invention, the camera processing unit (215) is capable to activating or deactivating the camera lens (217) based on commands received from the CPU (201) in the network communication-capable computing circuitry (225). The camera processing unit (215) may also supply electrical power to the camera lens (217). The camera processing unit (215) may also provide some preliminary processing of raw multimedia data captured from the camera lens (217). Examples of preliminary processing of raw multimedia data include image noise filtering, noise suppression, and other beneficial real-time adjustments. The network communication-capable computing circuitry (225) and its CPU (201) can then further process and transform the raw multimedia data into processed multimedia data in a standardized format, such as JPEG or MPEG.

Furthermore, in one embodiment of the invention, the network communication-capable computing circuitry (225) contains a plurality of logical units, such as the CPU (201), the camera data interface (203), the memory unit (205), the peripheral device and/or external communication I/O interface (207), the power management unit (209), the graphics unit (211), and the local data storage (213). These logical units may be placed on a single printed circuit board in one embodiment of the invention, or on a plurality of printed circuit boards in another embodiment of the invention.

Moreover, in the embodiment of the invention as shown in FIG. 2, the CPU (201) is configured to control each logical unit operatively (i.e. directly or indirectly) connected to the CPU (201). The memory unit (205) typically comprises volatile memory banks based on DRAM's. In some embodiments of the invention, the memory unit (205) may use non-volatile memory technologies such as SRAM's and/or Flash memory. The memory unit (205) is capable of storing or uploading programs and applications which can be executed by the CPU (201), the graphics unit (211), or another logical unit operatively connected to the memory unit (205). In one or more embodiments of the invention, a QR code recognition application program, a QR code generation application program, and other desired software components that provide data transformations and conversions from raw multimedia data to processed multimedia data in a standardized format may be stored in the local data storage (213), and then executed on the CPU (201) and the memory unit (205) of the smart webcam device as needed.

In addition, as shown in FIG. 2, the peripheral device and/or external communication I/O interface (207) may be operatively connected to a wireless transceiver and an radio frequency (RF) antenna for wireless data access via a cloud network. The peripheral device and/or external communication I/O interface (207) can also be operatively connected to a plurality of wireless or wired electronic devices (223) via a data network and/or a direct device-to-device connection method. Moreover, the power management unit (209) is operatively connected to a power supply unit and a power source (e.g. battery, power adapter) (221), and the power management unit (209) generally controls power supplied to various logical units in the smart webcam device. Furthermore, in one embodiment of the invention, the graphics unit (211) in the system block diagram (200) comprises a graphics processor, a display driver, a dedicated graphics memory unit, and/or another graphics-related logical components. In general, the graphics unit (211) is able to process and communicate graphics-related data with the CPU (201), the display driver, and/or the dedicated graphics memory unit. The graphics unit (211) is also operatively connected to one or more display units (219).

A key distinctions between a conventional webcam and a "smart" webcam is the lack of the network communication-capable computing circuitry (225) in the conventional webcam. Typically, the conventional webcam merely includes what is shown in FIG. 2 as the "webcam-specific circuitry" (227) that incorporates a camera lens and a camera processing unit. The conventional webcam functions as a slave device connected to a master device, such as a computer or another command-and-control unit. In contrast, the smart webcam incorporates the network communication-capable computing circuitry (225) with its own CPU, a localized data storage, a graphical unit, and a data modem, and is capable of executing a variety of software application programs as an independent master device.

FIG. 3 shows a first machine-to-machine (M2M) interaction diagram (300) between a first machine (i.e. the smart webcam device (101)) and a second machine (i.e. a tablet computer (307)), in accordance with an embodiment of the invention. In this embodiment of the invention, the first machine (i.e. the smart webcam device (101)) executes a QR code generation application program, which gathers dynamically-changing and real-time hardware setting information of the first machine. Subsequently, the first machine generates a first QR code (305) that embeds the hardware setting information of the first machine. Then, as shown in FIG. 3, the first QR code (305) is displayed on a television or another display panel (301). The QR code generation application program executed by the first machine also displays an instruction (303) on the television or another display panel (301) for a QR code scanning by the second machine.

As shown in FIG. 3, in the first machine-to-machine (M2M) interaction diagram (300) between the first machine (i.e. the smart webcam device (101)) and the second machine (i.e. a tablet computer (307)), the second machine embeds a camera and a camera processing unit that can capture and convert the first QR code (305) into the hardware setting information of the first machine. The second machine, which may be a tablet computer as depicted in FIG. 3 in one embodiment of the invention, or another electronic device in another embodiment of the invention, executes a QR code recognition application program in its CPU and a memory unit for deciphering and converting the first QR code (305) into the hardware setting information of the first machine.

Then, the second machine determines hardware communication compatibility between the hardware setting information of the first machine and a corresponding hardware setting information of the second machine. If a user selection is necessary, as shown in FIG. 3, the second machine can also display a particular selection (309) for hardware compatibility configuration between the first machine and the second machine. For example, a user interface in the second machine may display an available list of first-machine compatible networks for wireless communication. In FIG. 3, the available list of the first-machine compatible networks include "David's WiFi 1," "Rabbit LAN 71," and "Cellular LTE 101." The user, at his or her discretion, can select a particular network for communication between the first machine and the second machine. In one embodiment of the invention, in-range networks that are available and usable by the second machine are not part of the available list of the first-machine compatible networks, if the first machine is unable to utilize such networks due to incompatible operating frequencies, incompatible wireless protocols, incompatible hardware requirements, or for other reasons of incompatibility. Therefore, the particular selection (309) preferably only shows network names that are mutually compatible for the first machine, based on the hardware setting information of the first machine symbolized by the first QR code (305).

In another embodiment of the invention, no manual selection of networks or other human intervention may be necessary, and the second machine may automatically and autonomously select a particular wireless network for utilization, based on the hardware setting information of the first machine deciphered from the first QR code (305) and the second machine's own analysis and determination of an optimally-compatible network for communication with the first machine.

Figure 4:
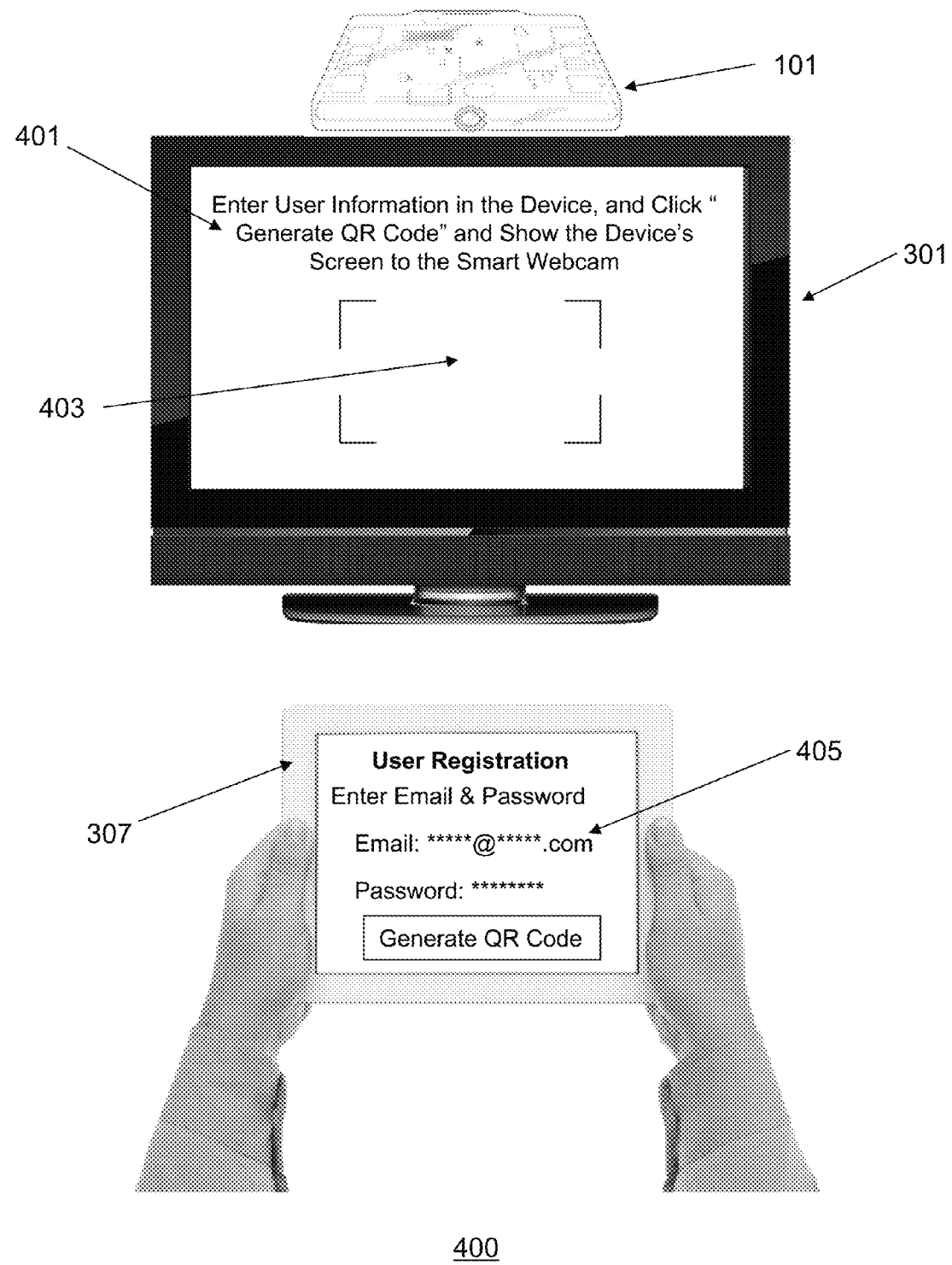
FIG. 4 shows a second machine-to-machine (M2M) interaction diagram between the first machine (i.e. the smart webcam device) and the second machine (i.e. a tablet computer), in accordance with an embodiment of the invention.

FIG. 4 shows a second machine-to-machine (M2M) interaction diagram (400) between the first machine (i.e. the smart webcam device (101)) and the second machine (i.e. the tablet computer (307)), in accordance with an embodiment of the invention. In this embodiment of the invention, the second machine has now completed processing and analyzing the hardware setting information of the first machine, which was symbolized in the first QR code (305 of FIG. 3) displayed by the television or another display panel (301). Furthermore, in the embodiment of the invention as shown in FIG. 4, the second machine may ask for user-specific information (405), such as a user email address and a user password, for registering the user in the first machine. Furthermore, the second machine can also execute its own QR code generation application program that gathers dynamically-changing and real-time hardware setting information of the second machine. Subsequently, the second machine can generate a second QR code that incorporates the hardware setting information of the second machine and the user-specific information (405), when "Generate QR Code" button is activated in the second machine, as shown in FIG. 4. In some instances, the second QR code can also embed the second machine's response to hardware compatibility inquiries made by the first machine through the first QR code (305 in FIG. 3).

Then, the second QR code is displayed on the second machine's own display unit (e.g. a display unit of the tablet computer (307), while the television or another display panel (301) connected to the first machine shows a next action instruction (401) to the second machine, as shown in FIG. 4. In one embodiment of the invention, the next action instruction (401) may be prompting the user to enter user information into the second machine, and also prompt the user to click the "Generate QR code" button and to flip the second machine's display unit towards the camera lens (105 of FIG. 1) of the first machine to face a targeted code scan area (403), as shown in FIG. 4 and FIG. 5.

In another embodiment of the invention, manual entry of user registration information may not be necessary, and the second machine may automatically and autonomously select the user-specific information (405), based on the second machine's own analysis and determination of appropriate user-specific information for registering the user and the second machine in the first machine.

Figure 5:
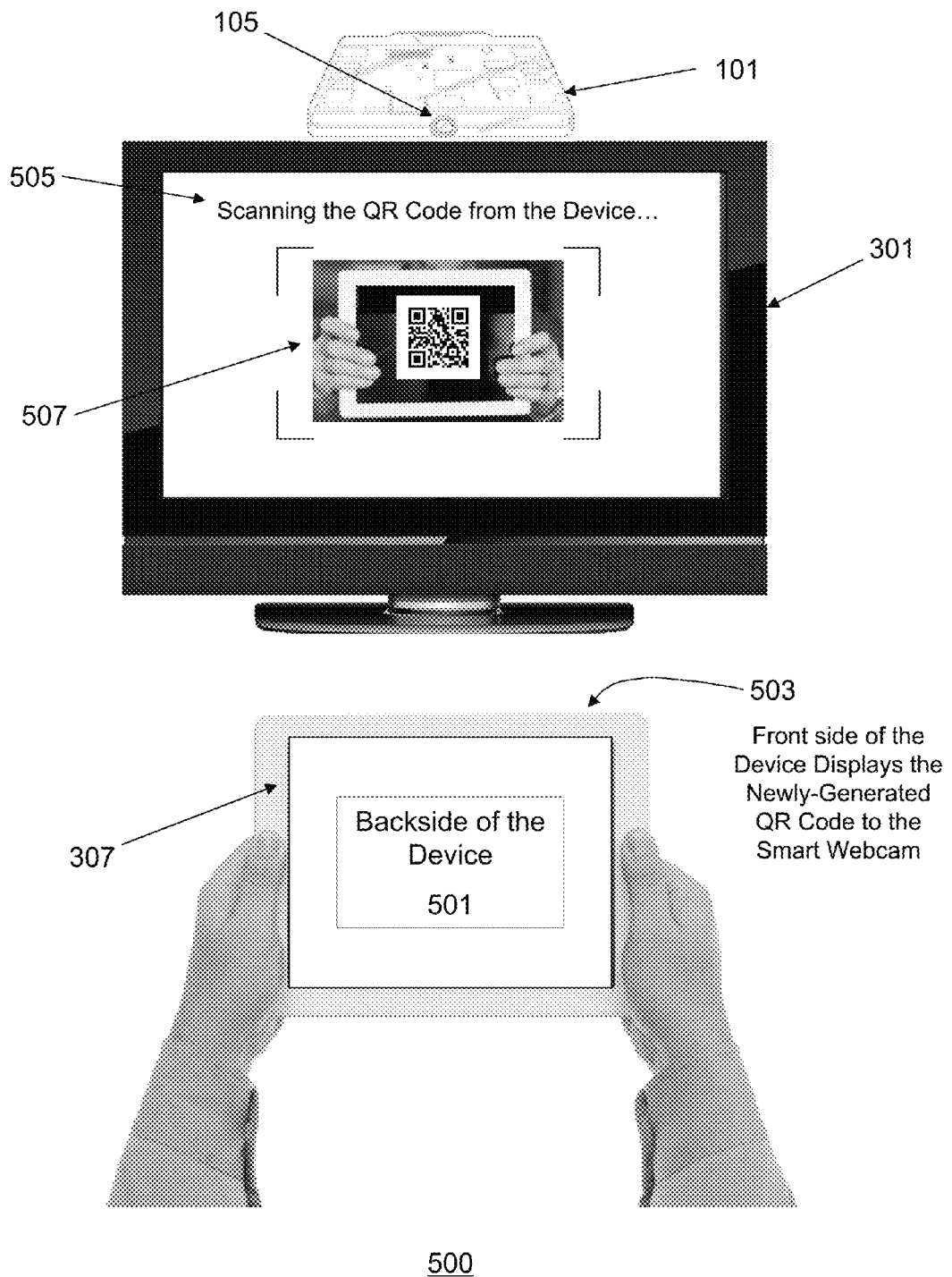
FIG. 5 shows a third machine-to-machine (M2M) interaction diagram between the first machine (i.e. the smart webcam device) and the second machine (i.e. a tablet computer), in accordance with an embodiment of the invention.

FIG. 5 shows a third machine-to-machine (M2M) interaction diagram (500) between the first machine (i.e. the smart webcam device (101)) and the second machine (i.e. the tablet computer (307)), in accordance with an embodiment of the invention. In this embodiment of the invention, the second machine's display panel, which displays the second QR code, faces the camera lens (105) of the first machine. Preferably, the second machine's display panel is on the front side (503) of the second machine, and the front side (503) of the second machine is facing the camera lens (105) of the first machine, while the backside (501) of the second machine is facing towards the user. The second QR code generated from the second machine incorporates the hardware setting information of the second machine and the user-specific information (405 of FIG. 4), when "Generate QR Code" button was activated in the second machine, as previously shown in FIG. 4. In some instances, the second QR code also embeds the second machine's response to the hardware compatibility inquiries made by the first machine through the first QR code (305 in FIG. 3).

As shown in FIG. 5, the second QR code displayed by the display unit of the second machine is visible in the targeted code scan area (403 of FIG. 4), which is now a second QR code scan area (507). The targeted code scan area (403 of FIG. 4) and the second QR code scan area (507) are generated by the first machine, and are displayed on the television or another display panel (301) connected to the first machine. The targeted code scan area (403 of FIG. 4) and the second QR code scan area (507) assist the second machine's display unit to be correctly aligned with the camera lens (105) of the first machine, as the second machine's display unit displays the second QR code for scanning by the first machine.

Continuing with FIG. 5, the first machine also generates and displays a status description (505) during the second QR code scanning to indicate the current status of information processing by the first machine for hardware and communication configuration initialization and setup between the first machine and the second machine. In the third machine-to-machine (M2M) interaction diagram (500) between the first machine (i.e. the smart webcam device (101)) and the second machine (i.e. the tablet computer (307)), the status description (505) states "Scanning the QR Code from the Device . . . ," as shown in FIG. 5. Other status descriptions may also be displayed during various stages of the machine-to-machine (M2M) visual code generation and recognition for simplifying and automating hardware communication settings and configurations between the two electronic devices.

Figure 6:
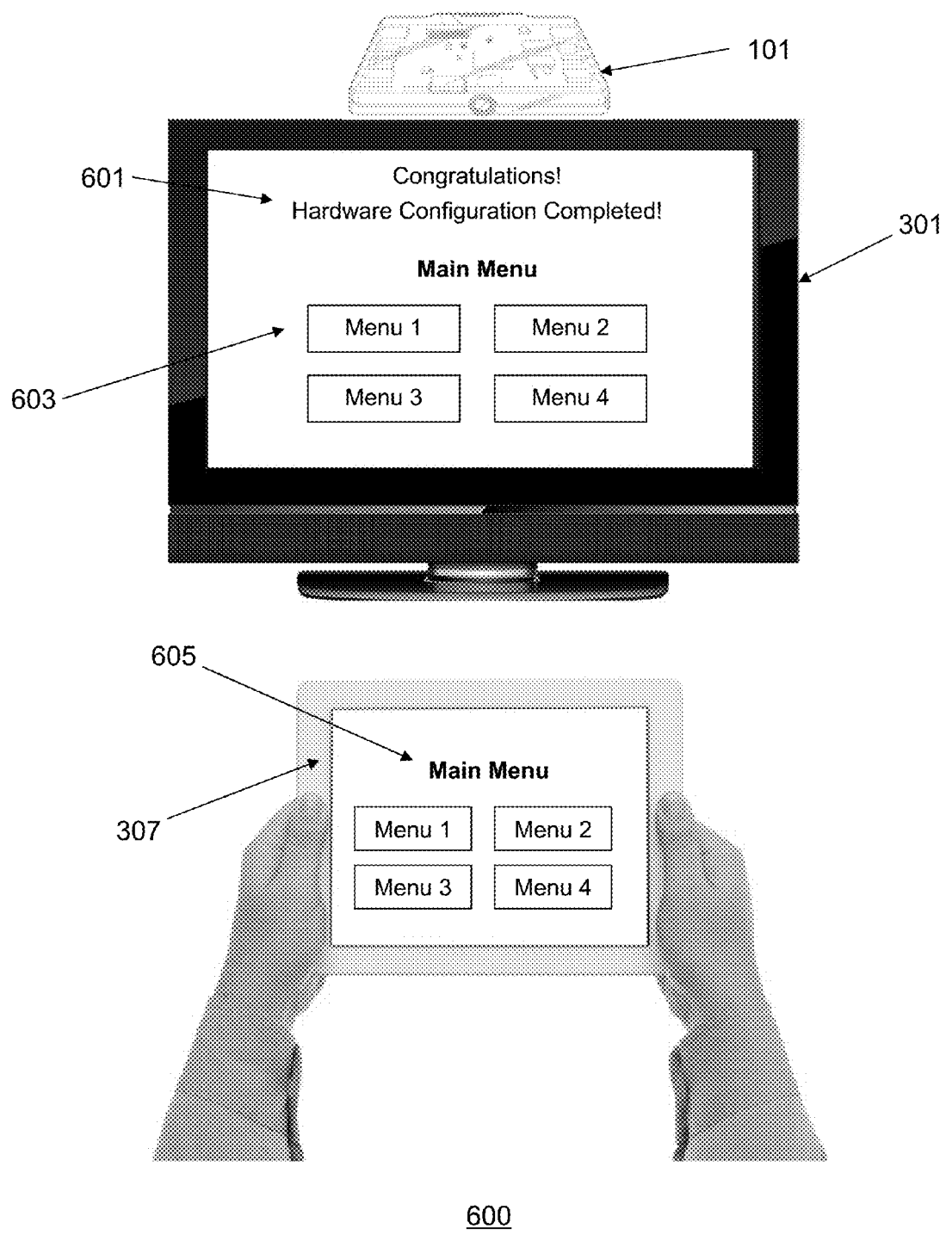
FIG. 6 shows a fourth machine-to-machine (M2M) interaction diagram between the first machine (i.e. the smart webcam device) and the second machine (i.e. a tablet computer), in accordance with an embodiment of the invention.

FIG. 6 shows a fourth machine-to-machine (M2M) interaction diagram (600) between the first machine (i.e. the smart webcam device (101)) and the second machine (i.e. the tablet computer (307)), in accordance with an embodiment of the invention. At this stage, the first machine and the second machine have discovered, selected, and initialized compatible hardware communication settings and device configurations for wireless data communication. In one embodiment of the invention, the wireless data communication may involve a compatible WiLAN, a cellular network, a Bluetooth connection, or another standardized wireless protocol.

Once the compatible hardware communication settings and device configurations are completed, the first machine and the second machine can communicate via a mutually-compatible wireless network. In the embodiment of the invention as shown in FIG. 6, the first machine displays a congratulatory status message (601) and a main menu (603) in the television or another display panel (301) connected to the first machine. If the first machine is the smart webcam device (101), as shown in FIG. 6, the main menu (603) provides a selection of functionalities for the smart webcam device (101). If the first machine is another electronic device, in another embodiment of the invention, the main menu (603) provides a selection of functionalities for that first machine.

Furthermore, the main menu (603), as displayed on the television or another display panel (301) by the first machine, may also be remotely displayed and controlled by the second machine, with a remote controller's main menu (605) displayed in the display unit of the second machine, as shown in FIG. 6. In one embodiment of the invention, the remote controller's main menu (605) mirrors the main menu (603) displayed on the television or another display panel (301) connected to the first machine. In another embodiment of the invention, the second machine may display another set of menu configured to control one or more functionalities of the first machine, because the hardware communication settings and device configurations have already been initialized and authorized through the machine-to-machine (M2M) visual code generation and recognition.

Figure 7:
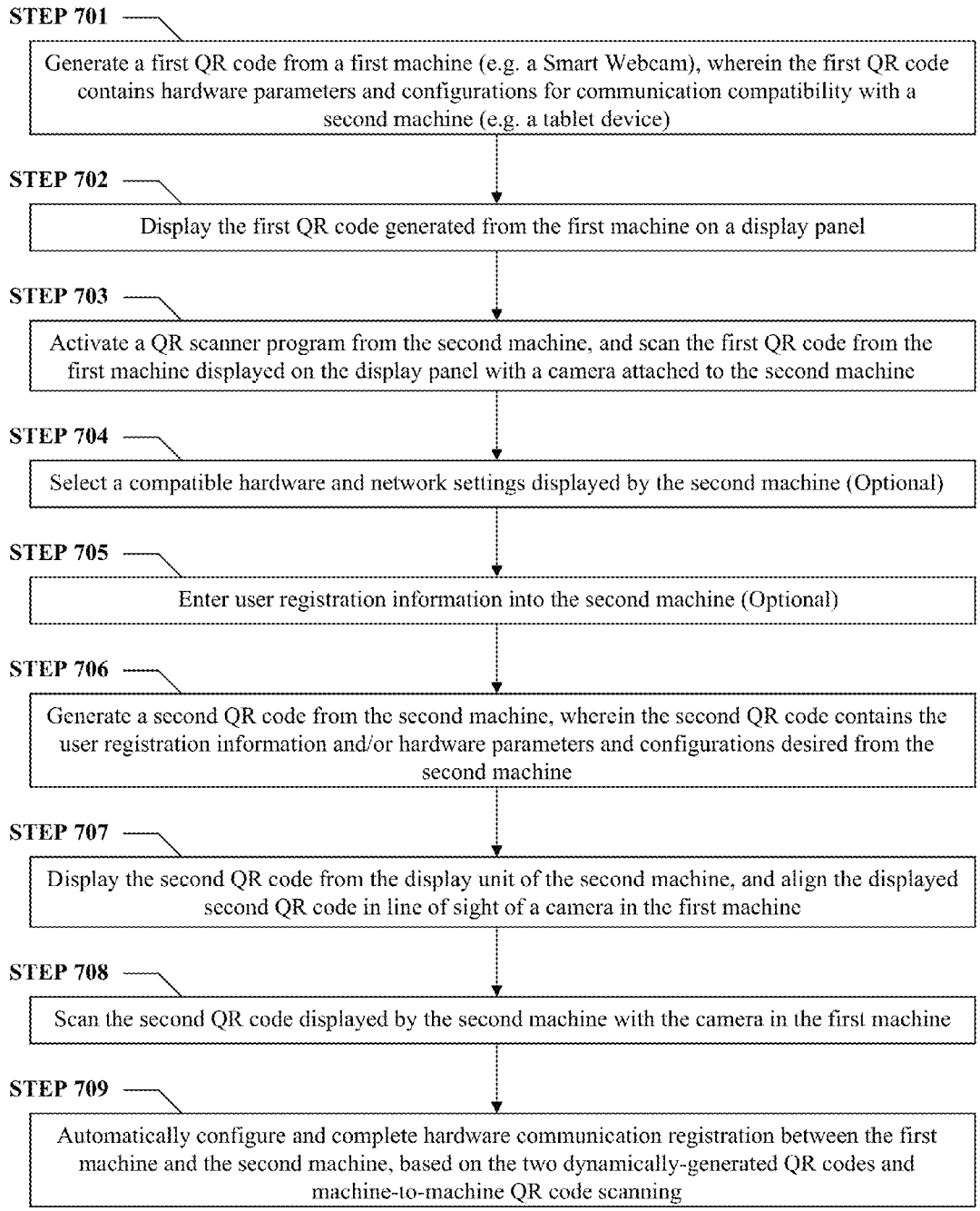
FIG. 7 shows a machine-to-machine (M2M) visual code generation and recognition method, in accordance with an embodiment of the invention.

FIG. 7 shows a machine-to-machine (M2M) visual code generation and recognition method (700), in accordance with an embodiment of the invention. As a first step, a first machine (e.g. a smart webcam device) generates a first QR code, wherein the first QR code contains hardware parameters and configurations for communication compatibility with a second machine (e.g. a tablet device), as shown in STEP 701. Then, the first machine displays the first QR code on a display panel connected to the first machine, as shown in STEP 702. Subsequently, a QR scanner application program is activated in the second machine, after which the first QR code generated by the first machine is scanned from the display panel using a camera attached to the second machine, as shown in STEP 703.

Then, as an optional step, a user may select compatible hardware and network settings displayed by the second machine, as shown in STEP 704. Alternatively, the second machine may autonomously choose what the second machine determines as a best choice for the compatible hardware and network settings, based on the first machine's hardware parameters and configurations information that was embedded in the first QR code.

Continuing with FIG. 7, as another optional step, the user may enter user registration information into the second machine, as previously illustrated and described for FIG. 4, and as also shown in STEP 705. Then, the second machine utilizes a QR code generation application program to generate a second QR code that contains the user registration information, the hardware parameters, and/or the hardware configurations desired from the second machine, as shown in STEP 706. Subsequently, the display unit of the second machine can display the second QR code, and align the displayed second QR code in line of sight of a camera in the first machine, as shown in STEP 707. The first machine then scans the second QR code displayed by the second machine, as shown in STEP 708. Because both the first machine and the second machine exchanged compatible hardware parameters and configurations information through the mutual exchange of QR codes in a machine-to-machine communication, the first machine and the second machine are now able to configure and complete the hardware communication initialization and user registration automatically, without requiring the user to manually enter, select, or adjust hardware settings and parameters for establishing wireless data communication, as shown in STEP 709.

Various embodiments of the present invention provide several advantages over conventional machine communication methods. For example, a novel machine-to-machine (M2M) visual code generation and recognition method, in accordance with an embodiment of the invention, simplifies and/or automates hardware communication settings and configurations between two electronic devices, without inconveniencing the user to adjust and explore hardware settings and parameters manually for establishing a wireless data communication between two electronic devices.

Furthermore, the electronic system that executes one or more mobile application software for enabling the novel machine-to-machine (M2M) visual code generation and recognition method, in accordance with an embodiment of the invention, provides an additional advantage of simplifying and automating the hardware communication settings and configurations between two electronic devices by utilizing visual codes as an initial method of device communication.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for machine-to-machine visual code generation and recognition for configuring hardware compatibility settings, the method comprising the steps of:

generating a first visual code from a first machine, wherein the first visual code contains the first machine's hardware parameters and configurations for a wireless protocol communication compatibility with a second machine;

displaying the first visual code on a first display panel connected to the first machine;

activating a visual code scanner application from the second machine, and scanning the first visual code from the first display panel connected to the first machine by activating a camera attached to the second machine;

decoding the first visual code with the visual code scanner application from the second machine to extract the first machine's hardware parameters and configurations for the wireless protocol communication compatibility with the second machine;

determining mutually-compatible hardware and network settings by comparing the first machine's hardware parameters and configurations and the second machine's hardware parameters and configurations;

displaying a user-selectable compatible hardware and network settings choice menu after the step of determining the mutually-compatible hardware and network settings on a second display panel connected to the second machine;

from the user-selectable compatible hardware and network settings choice menu, prompting a human user to intervene in a machine-to-machine communication process and manually select a user-preferred hardware and network settings choice from the user-selectable hardware and network settings choice menu displayed on the second display panel connected to the second machine;

dynamically encoding a personalized combination of the user-preferred hardware and network settings choice and a list of the second machine's compatible hardware parameters and configurations with the first machine as a second visual code in the second machine;

displaying the second visual code on the second display panel connected to the second machine to enable the first machine to scan the second visual code; and activating a user-preferred and compatible wireless communication between the first machine and the second machine, based on an exchange of the first visual code from the first machine, a human user intervention to manually select the user-preferred hardware and network settings choice after the second machine's autonomous determination of the mutually-compatible hardware and network settings to provide the user-selectable compatible hardware and network settings choice menu, and the second visual code from the second machine that dynamically encodes the personalized combination of the user-preferred hardware and network settings choice and the list of the second machine's compatible hardware parameters and configurations with the first machine.

2. The method of claim 1, further comprising a step of entering user registration information in the second machine, wherein the user registration information is additionally encoded into the second visual code.

3. The method of claim 1, wherein the first visual code and the second visual code are Quick Response (QR) codes.

4. The method of claim 1, wherein the first machine is a smart webcam device, and the second machine is a tablet computer or a smart phone.

5. The method of claim 1, wherein the first machine executes a first visual code generation application and a first visual code recognition application in a CPU and a memory unit of the first machine.

6. The method of claim 4, wherein the first display panel is a television connected to the smart webcam device, and the second display panel is an integrated display on the tablet computer or the smart phone.

7. The method of claim 1, wherein the user-preferred and compatible wireless communication is a wireless local area network (WiLAN) connection, a Bluetooth connection, or a cellular network connection with compatible operating frequencies, channel bandwidths, and encryption protocols that are mutually supported by the first machine and the second machine.

* * * * *